May 15, 1962  H. W. ASCHINGER  3,034,468
TOWED VEHICLE
Filed Sept. 29, 1959

INVENTOR.
Harold W. Aschinger

BY  Karl Huber  Attorney
    John B. Kovalish  Agent

United States Patent Office 3,034,468
Patented May 15, 1962

3,034,468
TOWED VEHICLE
Harold W. Aschinger, Ridgefield, N.J., assignor, by mesne assignments, to Vare Industries, Roselle, N.J., a corporation of New Jersey
Filed Sept. 29, 1959, Ser. No. 843,215
4 Claims. (Cl. 114—16)

The present invention deals with a towed vehicle and more particularly with a vehicle adapted for underwater travel and towed by a surfaced vessel.

In order to prevent a towed vehicle from travelling erratically, the towing cable attachment on the vehicle should of necessity be located at the center of drag of the vehicle when the vehicle is travelling underwater. Since the center of drag shifts with changes in speed of travel, a fixed towing cable attachment on the vehicle will subject the vehicle to travel erratically as a result of the center of drag shifting from the location of the cable attachment. Apart from the problems associated with the shifting center of drag, other considerations are necessary especially when the vehicle is to be adapted for towing from a surfaced vessel. These other considerations include the overall weight of the vehicle as associated with its balance and buoyancy when components of the vehicle are substituted by other similar or different components of different capacities, weights and form for operation under different conditions and purposes. For example, when the vehicle is employed for reconnaissance and signalling purposes, there is a requirement that the overall weight, balance and buoyancy be adjusted for optimum performance, but when the vehicle is armed for destroying a target or otherwise provided with means for removing obstacles, depositing markers, etc., the buoyancy and balance are affected and the vehicle no longer operates with optimum performance.

It is an object of the invention to provide a towed vehicle adapted for the adjustment of components thereof.

It is another object of the invention to provide a towed vehicle capable of maneuvering underwater and having a particular frame structure adapted for the adjustment of components mounted thereon.

Other objects and advantages of the invention will become apparent from the description hereinafter following and the drawings forming a part hereof, in which.

Figure 1:
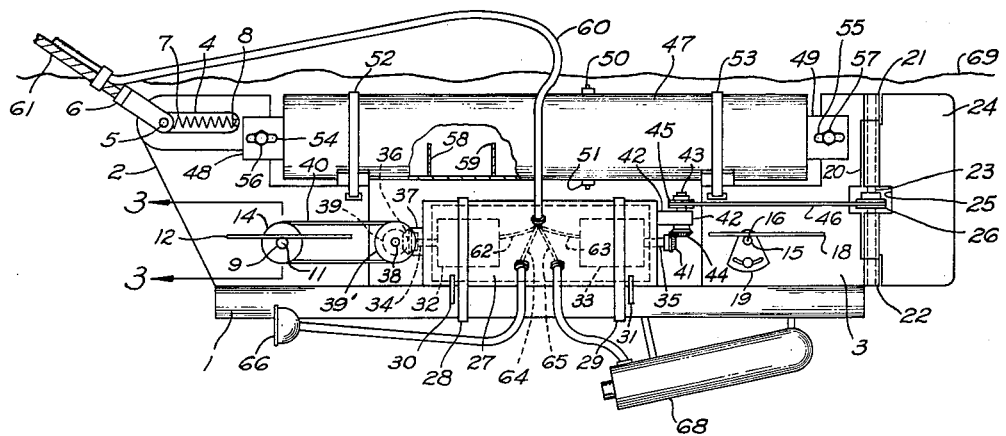
Figure 2:
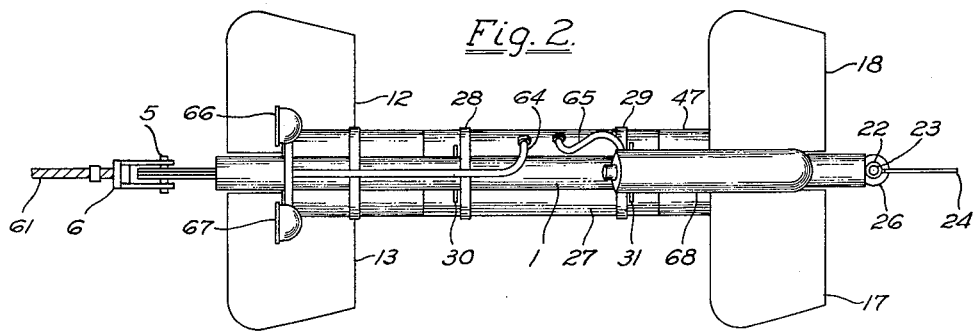
Figure 3:
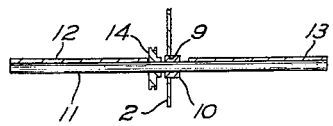

FIGURE 1 illustrates an elevational side view of a towed vehicle according to the invention, FIGURE 2 illustrates a bottom view of the vehicle of FIGURE 1, and FIGURE 3 illustrates a cross-sectional view along lines 3—3 of FIGURE 1.

The invention comprises essentially a vehicle having a frame structure such that it is adaptable for the mounting of essential embodiments thereon and means for adjusting the embodiments on the frame in accordance with the required buoyancy and balance necessary for optimum performance of the vehicle.

Regarding the illustrations, the vehicle comprises a frame having a keel 1 in the form of an elongated rod or tube and with vertical plates 2 and 3 mounted on the keel 1, the plates being mounted at each end of the keel and spaced from each other longitudinally of the keel. Plate 2 is a bow plate and plate 3 is a stern plate. The upper portion of bow plate 2 is provided with an elongated slot 4 formed therethrough. A shaft 5 passes through the slot 4 and a U-shaped yoke 6 is mounted on the shaft 5 and straddles the upper end of the plate. A resilient means, e.g. spring 7, is positioned in the slot 4 and is connected to the yoke 6 and to a stud 8 positioned at one end of the slot and secured to the bow plate. An aperture 9 is formed through the bow plate 2 with a cylindrical bearing 10 mounted in the aperture. A shaft 11 is journalled in the aperture and extends outwardly of both sides of the table. Hydrofoils 12 and 13 are mounted on shaft 11, one on each side of the bow plate. A wheel 14, e.g. a pulley or sprocket, is fixedly mounted on the shaft 11 between one hydrofoil 12 and plate 2.

An aperture 15 is formed through the stern plate 3 with a shaft 16 passing therethrough and extending outwardly of both sides of the plate. A pair of hydrofoils 17 and 18 are mounted on the shaft 16 on both sides of plate 3. An adjustable stop means 19 is mounted on plate 3 in engagement with the shaft 16, whereby the rotary position of the hydrofoil 18 is hand set at a selected degree of rotation. The stern plate 3 is cut-away through its rear edge forming a U-shaped notch 20 and upper and lower legs 21 and 22. A shaft 23 is rotatably mounted on and bridges the legs 21 and 22. A rudder 24 is fixedly mounted on the shaft 23 between legs 21 and 22. The rudder is cut-away forming a notch 25 and a wheel or pulley 26 is fixed to the shaft 23 within the notch 25.

A motor housing 27 is mounted on the keel 1 between the bow plate 2 and stear plate 3 by means of clamps 28 and 29, the clamps being adjustable and the housing being adjustable along the keel by means of slide guides 30 and 31, fixed to the housing an slidable along the keel. A pair of motors 32 and 33 are contained in the housing 27, and each having motor shafts 34 and 35 respectively extending outwardly of the ends of the housing. A bevel gear 36 is mounted on an end of shaft 34. An apertured lug 37 is fixed to the motor housing with a shaft 38 journalled therein. One end of the shaft is provided with a bevel gear 39 engaging gear 36 and the other end with a wheel or pulley 39'. An adjustable endless belt 40 is mounted over the pulley 39 and wheel 14 on shaft 11 for operating hydrofoils 12 and 13.

The shaft 35 of motor 33 has a bevel gear 41 at its end. An apertured lug 42 is fixed to the motor housing with a shaft 43 journalled therein. One end of the shaft 43 is provided with a bevel gear 44 engaging gear 41 and the other end with a wheel or pulley 45. An adjustable endless belt 46 is mounted over pulley 45 and pulley 26 on shaft 23 for operating the rudder 24.

A removable buoyancy tank 47 having ears 48 and 49, one at each end, is secured between the bow plate 2 and stern plate 3 by means of the ears being connected to the said plates. The buoyancy tank is spaced from and positioned above the motor housing 27. The tank is provided with ballast inlet means 50 and ballast outlet means 51. Adjustable clamp means 52 clamp the tank 47 to the bow plate 2 and adjustable clamp means 53 clamp the tank to stern plate 3. The tank ears 48 and 49 are provided with elongated slots 54 and 55 each having a bolt 56 and 57 positioned therein, whereby the tank is slidably adjustable for balancing between the said bow and stern plates. The tank is provided with baffles 58 and 59 for substantially equalizing or proportioning contained water ballast along the length of the tank.

An electrical conducting cable 60, which is attached to tow line 61, the tow line being secured to the yoke 6, passes to the motor housing 27 with leads 62 and 63 thereof being connected to motors 32 and 33 respectively. Leads 64 and 65 to cable 60 pass through the housing 27 and are connected to searchlights 66 and 67 and television camera 68.

In operation, the tank 47 and motor housing 27 are balanced by adjustment so that the vehicle is at even keel, and the tank is selected to have a capacity such that the entire vehicle has a neutral buoyancy and rides just below the water surface 69.

When additional other apparatus is attached to the vehicle, the water ballast is removed from the tank 47, or another tank of suitable buoyancy replaces tank 47, and the new tank and motor housing are further adjusted for balance.

As the vehicle is towed, the center of drag is simultaneously altered, but the resiliently connected tow yoke 6 automatically compensates for the change in center of drag to prevent erratic travel of the vehicle. An operator at a station on the towing vessel energizes and controls the movement of the vehicle by means of the motors 32 and 33 supplied with electrical energy through cable 60.

Various modifications of the invention are contemplated within the scope of the appended claims.

What is claimed is:

1. An underwater vehicle comprising an elongated keel, bow means and stern means mounted on the keel and spaced from each other longitudinally of the keel, the bow means and stern means being substantially in the form of plate-like members positioned vertically and longitudinally of the keel, a longitudinal buoyancy tank positioned above the keel and bridging the bow means and stern means, a first shaft mounted on the stern means vertically of the keel, rudder means rotatably mounted on the first shaft, hydrofoil members positioned on both sides of the bow means and mounted on a second shaft passing through the bow means, motor means adjustably mounted on the keel, drive means connecting the first and second shafts to the motor means, a substantially horizontal elongated slot formed through the upper portion of the bow means, a third shaft passing through the slot, a yoke member secured to the third shaft and straddling the bow means, resilient means mounted in the slot, the resilient means being secured to the bow means at one end of the slot and connected to the third shaft, said resilient means normally urging said third shaft toward one end of the slot, and a towing cable connected to the yoke member.

2. An underwater vehicle according to claim 1, wherein the motor means is contained in a motor housing adjustably mounted on the keel between the said second shaft and stern means.

3. An underwater vehicle according to claim 1, comprising hydrofoil means positioned on both sides of the stern means and mounted on a shaft passing through the stern means.

4. An underwater vehicle according to claim 1, comprising adjustment means mounted on both ends of the buoyancy tank, the adjustment means being secured to the bow means and stern means, whereby the buoyancy tank is longitudinally adjustable between the said bow means and stern means.

References Cited in the file of this patent

UNITED STATES PATENTS

| | | |
|---|---|---|
| 364,364 | Miller | June 7, 1887 |
| 832,646 | Wiebe | Oct. 9, 1906 |
| 1,336,110 | Turcan | Apr. 6, 1920 |
| 1,418,797 | Hammond | June 6, 1922 |
| 1,690,578 | Hammond | Nov. 6, 1928 |
| 2,361,949 | Langdon | Nov. 7, 1944 |
| 2,928,367 | McCormick | Mar. 15, 1960 |